United States Patent [19]

Slikkers

[11] Patent Number: 5,055,864

[45] Date of Patent: Oct. 8, 1991

[54] PORTABLE CAMERA BRACKET

[76] Inventor: David A. Slikkers, 13 Carousel La., Holland, Mich. 49423

[21] Appl. No.: 609,413

[22] Filed: Nov. 5, 1990

[51] Int. Cl.⁵ .............................................. G03B 17/56
[52] U.S. Cl. .................................................... 354/81
[58] Field of Search ................................... 354/81, 293

[56] References Cited

U.S. PATENT DOCUMENTS 3,833,196  9/1974  Protzman .............................. 354/81
4,569,579  2/1986  Kangas ................................. 354/293
4,615,597  10/1986  Burriss ................................. 354/293

Primary Examiner—Michael L. Gellner
Attorney, Agent, or Firm—Price, Heneveld, Cooper, DeWitt & Litton

[57] ABSTRACT

A portable camera bracket is disclosed which provides a stable platform for a camera in window openings. The camera bracket includes four legs and a platform which are easily assemble and disassembled for transporting and includes protective material for contacting the perimeter of the window openings.

19 Claims, 3 Drawing Sheets

PORTABLE CAMERA BRACKET

BACKGROUND OF THE INVENTION

The present invention pertains to a camera bracket, and more particularly to a camera bracket especially adapted to be used in a vehicle window opening.

When taking photographs with high powered lenses, or in low-light conditions, it is important to have a stable platform for the camera being used. One well-known support for providing a stable platform is a tripod, which provides a stable camera platform on flat surfaces, but is not well adapted for use in the door window openings of vehicles. Supports are known which are adapted for use in vehicle door windows; however, known supports do not provide a stable platform in differently shaped windows as they are not well adapted for adjustment to different windows or vehicle doors.

In addition to providing a stable platform, it is highly desirable to provide camera equipment which is relatively compact for easy transportation. It is thus important that the camera support be small in size, light weight yet provide a stable platform for large, heavy, camera lenses and camera, combinations. Known camera supports have not aduately satisfied this need for a small, lightweight camera bracket which provides a stable platform from which photographs may be taken through a vehicle window opening with high powered lenses, or under low-light conditions.

SUMMARY OF THE PRESENT INVENTION

The present invention is embodied in a camera bracket providing a stable platform by which photos may be taken from a window opening. Devices embodying the invention include a platform having a protective layer on the underside thereof for contacting the door window frame, and legs extending downwardly over the outside and inside walls of the vehicle door and having adjustable spacing, and most preferably including a protective coating thereon.

Because the legs are adjustable they provide stability for the platform by adjusting for the thickness and contour of the vehicle door walls below of the window opening. Additionally, the components of the bracket may be easily assembled and unassembled for transporting. These and other objects, advantages and features of the invention will become apparent upon review of the following specification in connection with the drawings.

DETAILED DESCRIPTION OF THE PREFERRED EMBODIMENT

Figure 1:
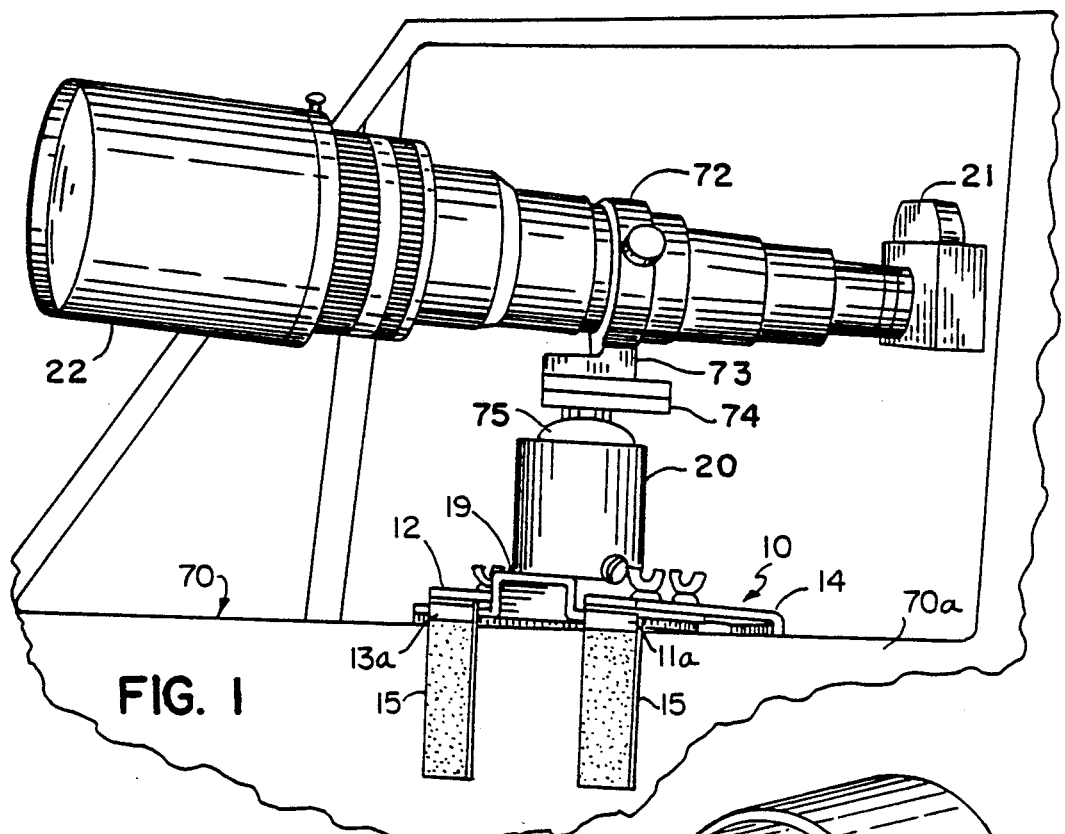
FIG. 1 is a perspective view of the camera bracket assembly according to the invention with a camera and tripod head mounted thereon, as viewed from the outside of a vehicle.
Figure 2:
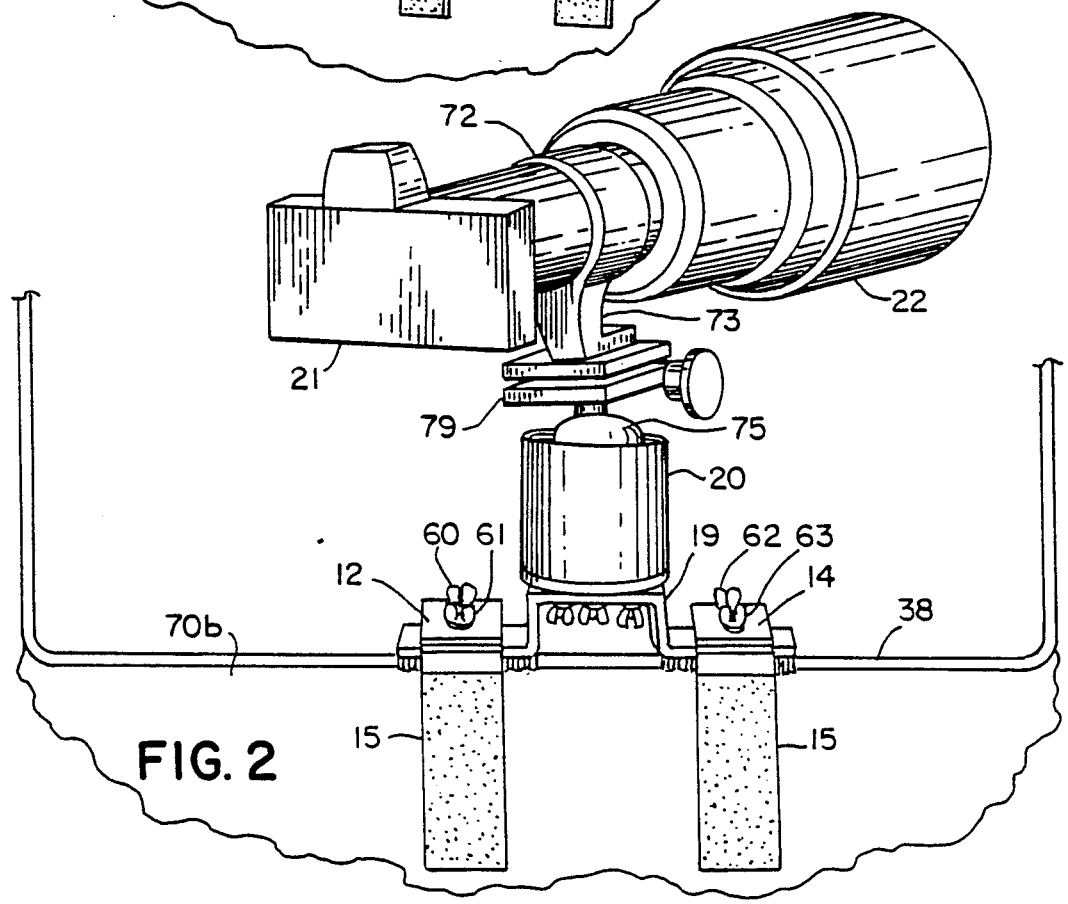
FIG. 2 is a perspective view of a camera bracket assembly according to the invention with a tripod head and a camera as viewed from the inside of a vehicle.

Referring now specifically to the drawings and the illustrated embodiments depicted therein, the camera bracket assembly 10 includes five major parts, namely, the four L-shaped members 11, 12, 13 and 14 and the base 19. The L-shaped members 11, 12, 13, 14 are connected to the base 19 to form U-shaped supports which fit over the edge of a vehicle door and can be adjusted to firmly clamp on the sides of the door of a vehicle (FIGS. 1 and 2). As disclosed in FIGS. 1 and 2, the bracket assembly 10 supports any standard tripod head 20 which, in turn, supports the camera 21 and lens 22. The L-shaped members include the depending legs 11a, 12a, 13a and 14a (FIG. 3), respectively. Each leg includes a rubber coating 15 which protects surfaces of the vehicle door with which the legs come into contact when the bracket is clamped on the door, such as painted metal and fabric. The coating 15 also provides non-slip contact with the surfaces of the door. The L-shaped members 11, 12, 13 and 14 also include the horizontally extending legs 11b, 12b, 13b and 14b. Legs 12b and 13b overlap each other and legs 11b and 14b overlap each other so as to form the U-shaped supports. Legs 12b and 14b have elongated slots 25 and 27 (FIG. 4) respectively, while leg 11b has circular openings 31 and 32, and leg 13b has circular openings 33 and 34, for purposes as will be described hereinafter.

Figure 5:
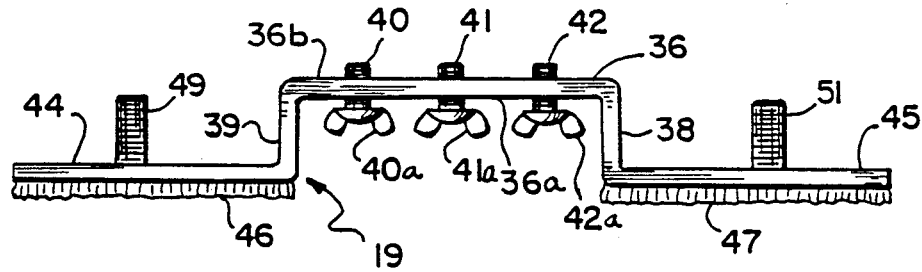
FIG. 5 is a side elevational view of one of the parts of the assembly, namely the camera bracket platform.

The camera bracket further includes a base 19 (FIGS. 4 and 5) having five portions. A center portion 36 provides a platform on which a tripod head 20 (FIG. 1) and camera 21 can be mounted. Center portion 36 is offset upwardly or elevated by portions 39 and 40 so as to provide a space between the bottom surface 36a of center portion 36 and a surface 38 on which the platform rests. Such space is provided to accommodate the heads 40a, 41a and 42a of wing bolts 40, 41 and 42, respectively. End portions 44 and 45 have threaded studs 48, 49, 50 and 51 mounted thereto, respectively, and extending upwardly therefrom. Threaded studs 48-51 may be provided by a bolt which is first screwed into a respective portion 44 or 45, and then has the heads removed therefrom. Alternatively, the threaded studs may be provided by flat head screws received in a threaded opening which is counter-bored to receive the head of the flat-head screw so that the surface of the screw head will be flush with the respective surfaces of portions 44 and 45. A protective material 46 and 47 is provided on the bottom surface of portions 44 and 45 so that bracket 10 will not damage surface 38 (FIG. 2) and to provide a non-slip surface. Thus, protective materials 46 and 47, are rough, non-marring surfaces which provide non-slip, non-abrasive, contact with the inside surface 38 of the window.

Figure 3:
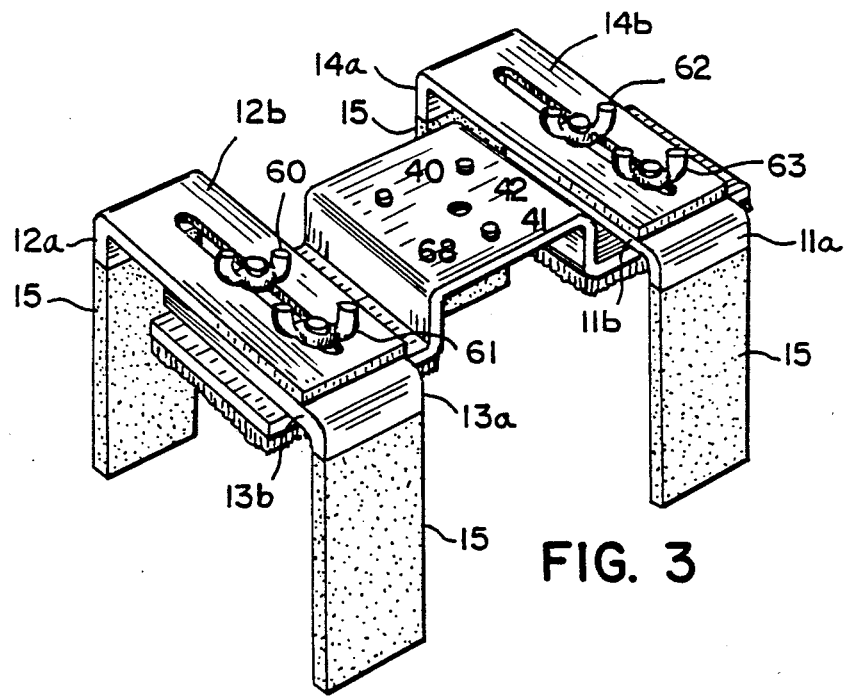
FIG. 3 illustrates an assembled camera bracket assembly according to the invention.
Figure 4:
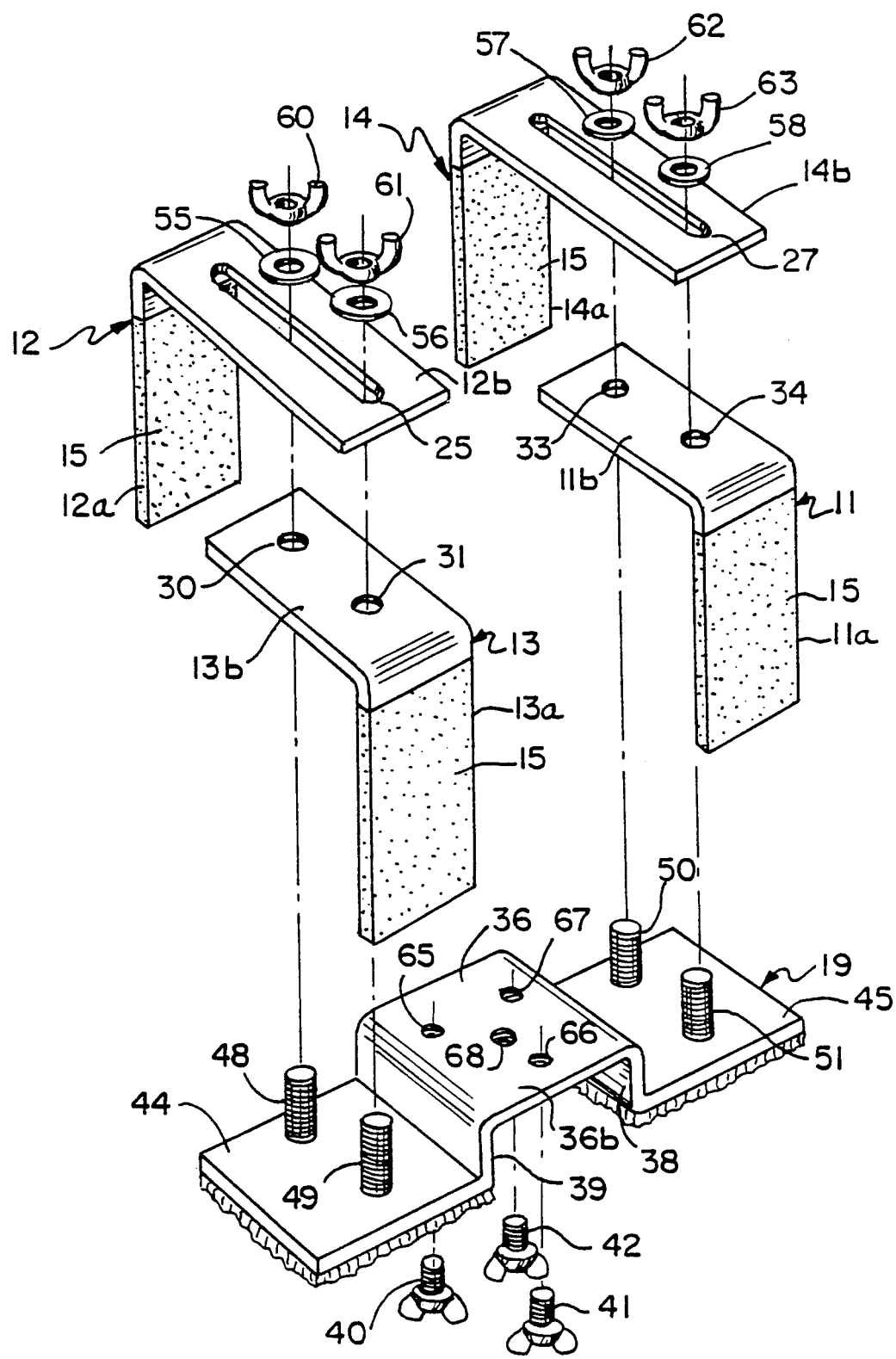
FIG. 4 is an exploded view of the bracket assembly of this invention illustrating its components when disassembled.

The assembled camera bracket is illustrated in FIG. 3. To assemble the camera bracket, legs 11 and 13 are placed in contact with the base 19 by receiving studs 48, 49, 50 and 51 within openings 30, 31, 33 and 34, respectively. Next, legs 12 and 14 are mounted over legs 13 and 11 by receiving threaded studs 48 and 49 throuqh slot 25, and studs 50 and 51 through slot 27. Washer 55 is then placed over stud 48 and wing nut 60 is threaded onto stud 48. Washers 56-58 are similarly placed over studs 49-51 and wing nuts 61-63 are then affixed to studs 49-51, respectively, to provide the assembled mount. To receive a tripod head 20, a bolt therefore is received through threaded aperture 68 and received by tripod head 20.

Figure 6:
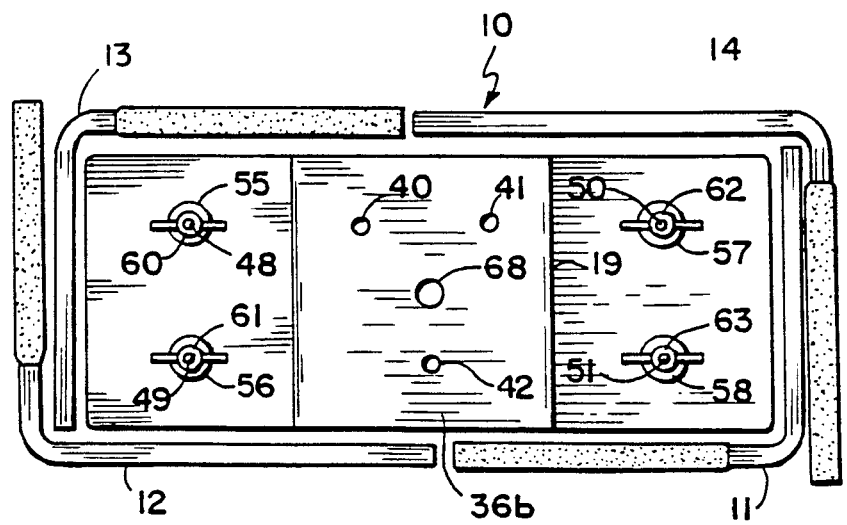
FIG. 6 is a plan view of all the parts unassembled and arranged to be carried in a neat small package.

When unassembled, the camera bracket 10 (FIG. 6) is relatively small. The four L-shaped members 11-14 may be positioned around base 19 such that each leg 11a-14a and each horizontal section 11b-14b of members 11-14 are parallel to a side of base 19, when base 19 lies flat on a flat horizontal surface. Additionally, wing bolts 40-42 are loosened such that they are within threaded apertures 65-67, respectively, but do not extend above the upper surface 36b (FIGS. 4, 5 and 6) of center portion 36. Further, washers 55-58 and wing nuts 60-63 are received on studs 48-51. The components of the bracket may thus be positioned in the bottom of a camera bag, suitcase, glove compartment or any other small area, so that the camera bracket may be easily transported and available for use whenever desired.

Operation

When the bracket assembly is to be used, the wing nuts 60, 61, 62 and 63 are loosened to permit the opposing legs 11a and 14a and legs 12a and 13a to be slid outwardly a sufficient distance from each other so that legs 11a and 13a can be placed on one side 70a (FIG. 1) of a vehicle door 70 and legs 12a and 14a can be placed on the other side 70b (FIG. 2) of the door opening. The L-shaped elements are then adjusted inwardly to clamp onto the sides of the door with the portions 44 and 45 resting on window edge 38 to provide a platform for the tripod head 80 which supports the camera 70 and lens 71 attached thereto. The L-shaped brackets 11, 12, 13 and 14 are adjusted toward sides 70a and 70b of the door so as to clamp onto the door. The wing nuts 60, 61, 62 and 63 are then tightened to firmly hold the bracket assembly 10 on the door.

As illustrated in FIGS. 1 and 2, lens 22 is held by bracket 72 to support 73 which, in turn, is affixed to a platform 74. Tripod head 20, in turn includes platform 74, ball 75 and chamber 76 and is standard equipment for tripods. Tripod head 20 is attached to platform 19 by wing bolts 40-42, as well as a center bolt (not shown) received in the threaded aperture 68.

As described above, rubber coating 15 on the legs provides protection for paint on the vehicle exterior and other material provided on the door panel, and also prevents sliding of the bracket. Coating 15 is applied to the legs which may be manufactured from brushed aircraft aluminum. The protectors 21 and 22 prevent scratching of the window frame, as well as providing a stable support for the camera bracket when resting on the window sill.

It will become apparent to those skilled in the art that various modifications to the preferred embodiment described and disclosed herein can be made, which modifications will however fall within the spirit or scope of the invention as defined by the appended claims.

The embodiments of the invention in which an exclusive property or privilege is claimed are defined as follows:

1. A support bracket for supporting camera apparatus in the window opening of a door of a vehicle and providing a stable platform for such camera apparatus comprising:
   a plurality of generally L-shaped elements each having a horizontal leg and a downwardly extending leg; at least two of said elements having their downwardly extending legs extending generally in the same direction in spaced relationship to each other; said horizontal leg of said two L-shaped elements having means adapted to provide a sliding motion relative to each other for adjusting the distance between said downwardly extending legs for accommodating different thicknesses and shapes of the perimeter of an opening in which the camera apparatus is to be mounted; and
   a platform carried by said L-shaped elements and adapted to be coupled to said camera apparatus for supporting the same.

2. The support bracket as defined in claim 1, further including a coating on each of said downwardly extending legs which prevents slipping of the legs relative to a surface and protects said surface when said legs are in contact with said surface.

3. The support bracket as defined in claim 1, further including means carried by a bottom surface of said platform for providing non-slip contact with a surface of the perimeter of said opening and protecting said surface of said opening perimeter.

4. The support bracket as defined in claim 1, wherein said plurality of L-shaped elements are formed by two pairs of L-shaped elements, each element having a horizontal leg and a downwardly depending leg, one horizontal leg of each pair of said L-shaped members having openings for receiving studs, and the other horizontal leg of each pair of L-shaped members including slots adapted to slide around said studs.

5. The support bracket as defined in claim 4, wherein said studs are threaded and carried by said platform, and further including nut means adapted to be received by said threaded studs whereby said legs can be secured to said platform.

6. The support bracket as defined in claim 5, further including a coating on said legs which prevents slipping of the legs relative to a surface, and protects said surface, when said legs are in contact with said surface.

7. The support bracket as defined in claim 6, further including means carried by a bottom surface of said platform for providing non-slip contact with the perimeter of said opening and protecting the surface of said opening perimeter.

8. A method of supporting camera apparatus in a vehicle window opening defined by a vehicle window door frame comprising the steps of:
   providing spaced adjustable legs having means for adjusting the space between said legs to fit over and contact the sides of different thicknesses of the door in which the vehicle window frame is located;
   providing a platform having means to support said camera apparatus;
   loosely attaching said adjustable legs and said platform together;
   adjusting the spacing between said legs a sufficient distance whereby said platform can be placed over the bottom edge of said vehicle window door frame with the legs extending downwardly along opposite sides of said door;
   placing the adjustable legs and platform over the bottom edge of said vehicle window frame; and
   adjusting opposite spacing of said legs whereby said legs are clamped to opposite sides of said door to provide a secure coupling of said camera apparatus to said vehicle window door frame.

9. The method as defined in claim 8, further including the step of a providing a coating on said legs for preventing slipping of the legs and protecting the surfaces of said door when said legs are in contact with said surfaces.

10. The method as defined in claim 8, further including the step of providing a bottom surface on said platform for making non-slip contact with the perimeter of said window door frame and protecting the surface of said frame perimeter.

11. The method as defined in claim 8, further including the step of providing two spaced studs and two pairs of L-shaped segments having said legs integral therewith; each of said pairs of L-shaped segments including one segment having an opening for receiving a stud and another segment having a slot adapted to receive and slide around a stud; and placing one pair of L-shaped segments over one of said studs and the other pair of L-shaped segments over the other of said studs with the respective opening and slot of each pair receiving the stud over which it is placed.

12. The method as defined in claim 11, wherein said studs are threaded and carried by said platform, and further including the step of providing nut means received by said threaded studs; and tightening said nuts on said studs against said L-shaped segments whereby said legs are secured to said platform and are held in a secure clamped position against the sides of the window door frame.

13. The method as defined in claim 12, further including the step of coating said legs to prevent slipping of the legs and protecting surfaces of said door when said legs are in contact with said surface.

14. The method as defined in claim 13, further including the step of providing a means carried by a bottom surface of said platform for providing non-slip contact with the perimeter of said window door frame and protecting the surface of said frame perimeter.

15. A bracket for providing a stable support for a camera so that pictures may be taken through a vehicle window, comprising:

four generally L-shaped legs which are adjustable to provide secure contact with the inside and outside of a vehicle around a window opening; and a platform supported by said legs and adapted to provide a secure interface with the inside surface of the window perimeter and for receiving a tripod head for carrying the camera thereon.

16. The device as defined in claim 15, including two spaced studs and wherein said plurality of legs include four L-shaped legs, two of said L-shaped legs having openings for receiving studs, and two other L-shaped legs including slots adapted to slide around said studs.

17. The device as defined in claim 16, wherein said studs are threaded and carried by said platform, and further including nut means adapted to be received by said threaded studs whereby said legs can be secured to said platform.

18. The device as defined in claim 17, further including a coating on said legs which prevents slipping of the legs and protects a surface when said legs are in contact with said surface.

19. The support bracket as defined in claim 18, further including means carried by a bottom surface of said platform for providing non-slip contact with the perimeter of said opening and protecting the surface of said opening perimeter.

* * * * *